(12) United States Patent
Ueda et al.

(10) Patent No.: US 6,640,677 B2
(45) Date of Patent: Nov. 4, 2003

(54) MACHINE TOOL

(75) Inventors: Toshio Ueda, Yamatokoriyama (JP); Tsutomu Tokuma, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 09/929,288

(22) Filed: Aug. 15, 2001

(65) Prior Publication Data

US 2002/0053268 A1 May 9, 2002

(30) Foreign Application Priority Data

Aug. 18, 2000 (JP) ........................................ 2000-248292

(51) Int. Cl.[7] .............................. B23B 3/34; B23B 19/02
(52) U.S. Cl. ........................................... 82/129; 82/142
(58) Field of Search ........................... 82/118, 120, 121, 82/129, 142, 148, 149

(56) References Cited

U.S. PATENT DOCUMENTS

| 2,080,207 | A | | 5/1937 | Hoppe | |
|---|---|---|---|---|---|
| 4,327,614 | A | * | 5/1982 | Klancnik et al. | 82/143 |
| 4,457,193 | A | | 7/1984 | Matthey | |
| 4,800,790 | A | * | 1/1989 | Hasz | 82/117 |
| 4,807,501 | A | * | 2/1989 | Leigh et al. | 451/19 |
| 4,827,814 | A | * | 5/1989 | Wilkins | 82/1.11 |
| 5,127,140 | A | * | 7/1992 | Oiwa et al. | 29/27 C |
| 2002/0014139 | A1 | * | 9/2001 | Hirose et al. | 82/118 |

FOREIGN PATENT DOCUMENTS

| DE | 649 097 | 8/1937 |
|---|---|---|
| GB | 655090 | 7/1951 |

* cited by examiner

*Primary Examiner*—A. L. Wellington
*Assistant Examiner*—Brian D. Walsh
(74) *Attorney, Agent, or Firm*—Smith Patent Office (57) ABSTRACT

A machine tool which can avoid interference between a tool post body and a second headstock without increasing the size of a fixed bed or decreasing the structural support rigidity is disclosed. Specifically, a combined-machining lathe comprises a first headstock fixed on a fixed bed; at least one of a tailstock and a second headstock is movably disposed on the fixed bed so as to be movable along the fixed bed; and a tool post body for rotationally supporting a turret having a plurality of tools set thereon. The tool post body is movably disposed between the first headstock and the at least one of a tailstock and a second headstock. The turret is placed on one side of the tool post body that is closer to the at least one of a tailstock and a second headstock, and the first headstock has a recessed portion that is dimensioned to accommodate the tool post body therein.

6 Claims, 6 Drawing Sheets

MACHINE TOOL

BACKGROUND OF THE INVENTION

1. Field of the Invention

The present invention relates to a machine tool in which a first headstock is fixed on a fixed bed at a longitudinal leftside end portion thereof as viewed from the machine front while a second headstock or tailstock is movably provided at a right-side end portion thereof, and a tool post is movably provided between the first and second headstocks.

2. Discussion of the Related Art

There has conventionally been provided a combined-machining lathe in which a first headstock is fixed on a fixed bed at a left-side end portion thereof as viewed from the machine front while a second headstock is provided at a right-side end portion thereof so as to be movable in a Z-axis direction. The upper and lower tool posts are provided between the two headstocks so as to be movable in the Z-axis direction. The lower tool post is placed linearly on the same fixed bed as the first and second headstocks.

In this type of combined-machining lathe, a workpiece set on the first headstock is machined by the lower tool post, while a workpiece set on the second headstock is machined by the upper tool post.

The lower tool post is structured so that a turret with a plurality of tools set thereon is rotationally indexably mounted on the tool post body. The turret is generally placed on the first headstock side of the tool post body.

The prior art combined-machining lathe described above adopts a structure that the lower tool post is placed linearly between the first and second headstocks on the fixed bed. This placement relationship means that the tool post body and the second headstock are likely to interfere therewith. Thus, there is a need for adopting a structure that avoids their interference.

For avoidance of such interference between the tool post body and the second headstock, it could be conceived to increase the distance therebetween. However, this would cause the fixed bed to become longer, which leads to a problem that the whole machine would be larger.

It could also be conceived to make the spindle portion of the second headstock largely overhang from the base portion toward the tool post side so as to avoid the interference with the tool post body. However, making the spindle portion of the second headstock overhang would cause the second headstock to decrease in structural support rigidity, which may, in some cases, lead to a decrease in machining accuracy.

SUMMARY OF THE INVENTION

The present invention has been accomplished by considering these circumstances in the prior art.

An object of the present invention is to provide a machine tool which can avoid interference between the tool post body and the second headstock without causing any increase in size of the whole machine or any decrease in the structural support rigidity.

In order to achieve the above object, in a first aspect of the present invention, there is provided a machine tool comprising: a first headstock fixed on a fixed bed; at least one of a tailstock and a second headstock is movably disposed on the fixed bed so as to be movable along the fixed bed; and a tool post body for rotationally supporting a turret having a plurality of tools set thereon, the tool post body being movably disposed between the first headstock and the at least one of a tailstock and a second headstock, wherein the turret is placed on one side of the tool post body that is closer to the at least one of a tailstock and a second headstock, and the first headstock has a recessed portion that is dimensioned to accommodate the tool post body therein.

In a second aspect of the invention, there is provided a machine tool as described according to the first aspect, wherein the first headstock comprises a base portion fixed to the fixed bed, and a spindle portion for supporting a spindle, the spindle portion including an overhanging portion that extends toward the at least one of a tailstock and a second headstock, the overhanging portion being connected to the fixed bed by a leg portion, and wherein the recessed portion is defined by the overhanging portion, the base portion and the leg portion.

In a third aspect of the invention, there is provided a machine tool as described according to the first or second aspect, wherein the base portion of the first headstock is formed so as to extend from an upper edge of a sloped surface to a lower edge of the sloped surface.

With the machine tool according to the present invention, since the turret is placed on one side of the tool post body closer to the tailstock (or the like such as a second headstock), interference between the tool post body and the tailstock (or the like) can be avoided without making the tailstock (or the like) overhang, thereby avoiding a decrease in the structural support rigidity involved in making the tailstock (or the like) overhang. This also results in preventing a decrease in the machining accuracy.

Also, since an accommodating portion into which the tool post body is allowed to enter is formed in the first headstock, the machining of the workpiece can be carried out while the tool post body is accommodated in the accommodating portion. Thus, while the turret is placed on the side closer to the tailstock (or the like), the workpiece can be machined with the cutting tool of the turret without increasing the size of the fixed bed and therefore the size of the whole machine can be maintained.

In the second aspect of the invention, since an accommodating or recessed portion is formed by making the spindle portion of the first headstock overhang from the base portion toward the tailstock (or the like) and by fixing this overhanging portion to the fixed bed with the leg portion, a decrease in the structural support rigidity can be avoided.

In the third aspect of the invention, since the base portion of the first headstock is formed so as to extend from an upper edge of a sloped surface to a lower edge of the sloped surface, a decrease in the structural support rigidity in making the spindle portion overhang can also be avoided in this respect.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Hereinbelow, embodiments of the present invention are described with reference to the accompanying drawings.

FIGS. 1 to 6 are views for explaining a machine tool (specifically a combined-machining lathe) in accordance with one embodiment of the invention.

Figure 1:
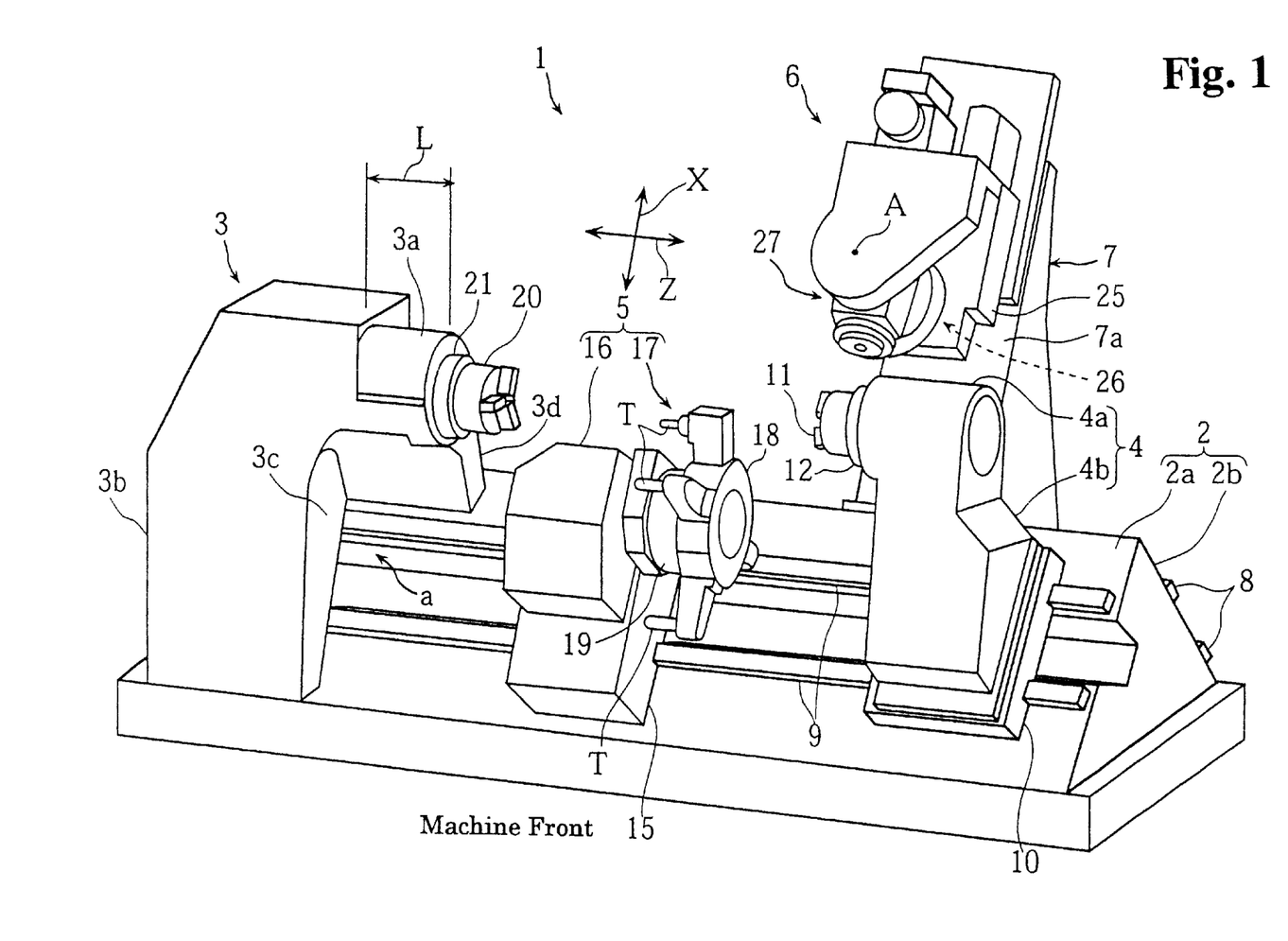
FIG. 1 is a perspective view for explaining a combined-machining lathe according to an embodiment of the present invention.

In the figures, reference numeral 1 denotes a combined-machining lathe, having a first headstock 3 provided at a longitudinal left-side end portion of a fixed bed 2, as viewed from the machine front, and a second headstock 4 provided at a right-side end portion of the fixed bed 2. The first and second tool posts 5, 6 are provided between the first and second headstocks 3, 4.

Figure 2:
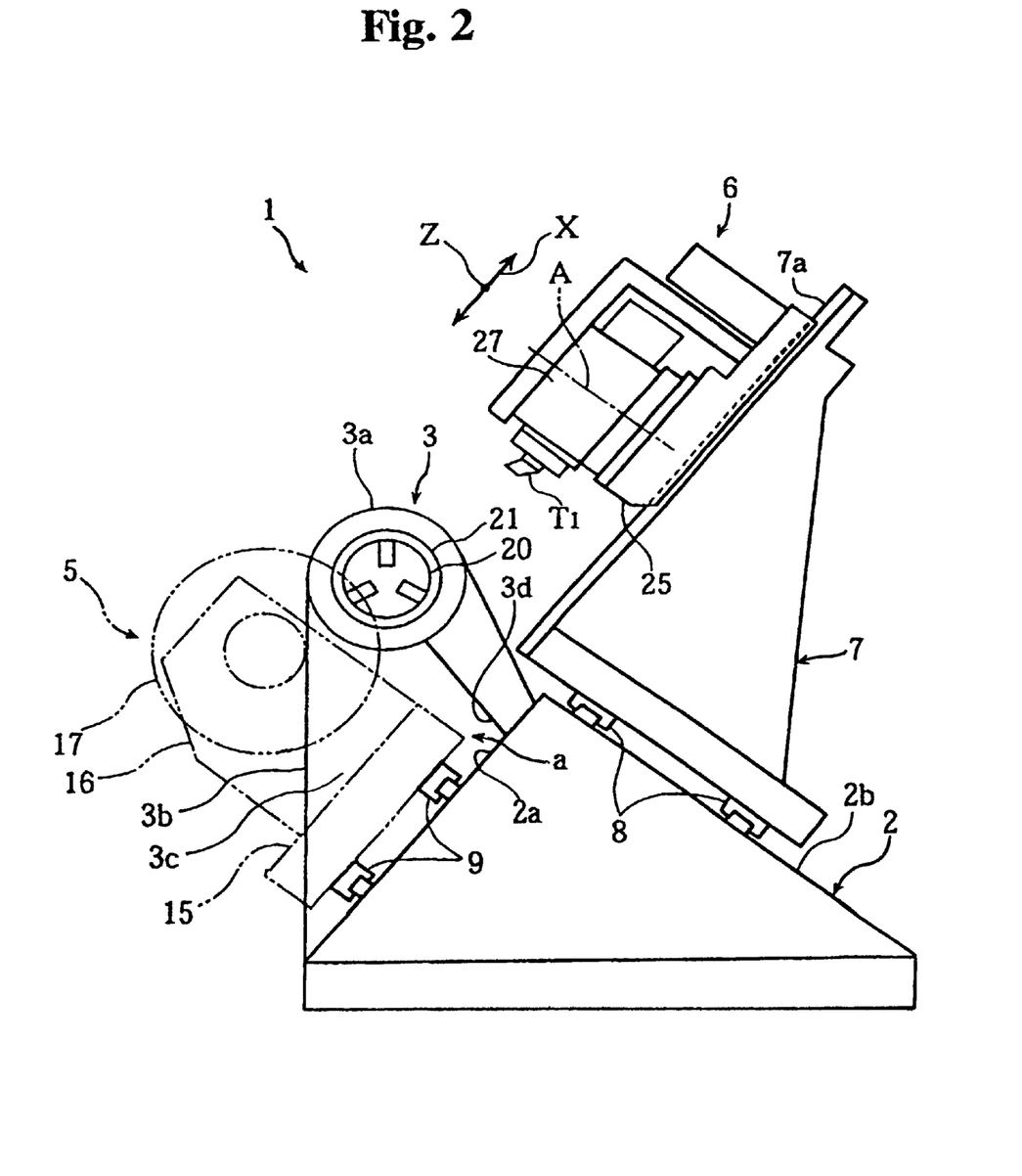
FIG. 2 is a side view of the combined-machining lathe according to an embodiment of the present invention.

The fixed bed 2 is formed into a triangular prism shape having a front-sloped surface 2a and a rear sloped surface 2b as viewed in the side view shown in FIG. 2. The first and second headstocks 3, 4 and the first tool post 5 are placed linearly on the front sloped surface 2a, and the second tool post 6 is placed on the rear sloped surface 2b.

Two guide rails 8 are disposed parallel to each other on the rear sloped surface 2b of the fixed bed 2, and a column 7 is mounted on the guide rails 8 so as to be movable in a Z-axis direction (the right-and-left direction when viewed from the machine front). The second tool post 6 is mounted on a forward-declined sloped surface 7a of this column 7 so as to be movable in an X-axis direction (the back-and-forth direction as viewed from the machine front) as shown in FIGS. 1 and 2.

Two guide rails 9 are disposed on the front sloped surface 2a of the fixed bed 2, and a headstock base 10 is mounted on these guide rails 9 so as to be movable in the Z-axis direction. The second headstock 4 is fixed on the headstock base 10. This second headstock 4 is composed of a spindle portion 4a for rotatably supporting a second spindle 12 on which a chuck 11 that grasps a workpiece is disposed, and a base portion 4b adjacent to and extending downwardly from the spindle portion 4a. This base portion 4b has a bottom surface sloped so as to be parallel to the front sloped surface 2a and thus the second headstock 4 can be oriented so that it extends vertically up from the front sloped surface 2a.

A saddle 15 is mounted on the guide rails 9 of the front sloped surface 2a so as to be movable in the Z-axis direction, and the first tool post 5 is mounted on the saddle 15 so as to be movable in the X-axis direction. This first tool post 5 is equipped with a tool post body 16 movably supported by the saddle 15, and a turret 17 mounted on the right side surface of the tool post body 16 so as to face the second headstock 4.

The turret 17 is constructed so that a turret head 18 having a plurality of tools T set thereon that are spaced at specified intervals on its outer periphery and they are rotationally and indexably supported by a rotational index head 19. Thus, the turret 17 rotationally indexes and locates a specified tool T at a specified machining position, and clamps the tool T in the machining position.

The first headstock 3 comprises a spindle portion 3a for rotatably supporting a first spindle 21 having a chuck 20 for grasping a workpiece, and a base portion 3b adjacent to the spindle portion 3a that extends downwardly. This base portion 3b is fixed to the fixed bed 2. The base portion 3b is formed with a broad width so as to extend from an upper edge portion to a lower edge portion of the front sloped surface 2a, stretching over the guide rails 9.

As shown in FIG. 1, the spindle portion 3a of the first headstock 3 extends toward the second headstock 4 side to an extent L with respect to the base portion 3b. Further, a leg portion 3d is formed integrally with this extended or overhanging portion. The leg portion 3d is fixed to an upper edge portion of the fixed bed 2. By this leg portion 3d, structural support rigidity for the overhanging portion of the spindle portion 3a is ensured. Thus, the overhanging portion of the spindle portion 3a, a right-hand end face 3c of the base portion 3b and the leg portion 3d define an accommodating or recessed portion "a" which is large enough for the saddle 15 and the tool post body 16 to enter.

Figure 3:
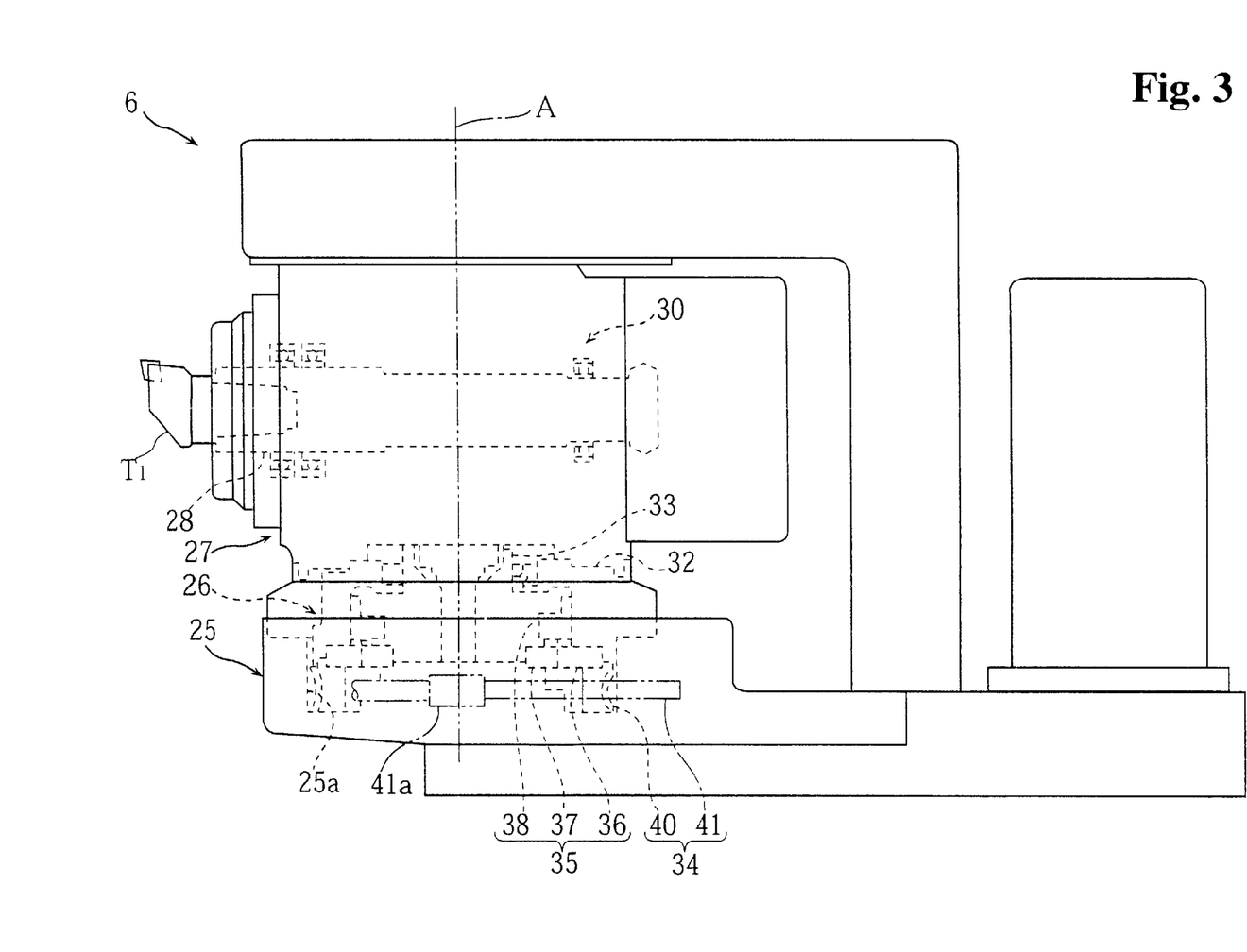
FIG. 3 is a side view of a second tool post of the combined-machining lathe according to an embodiment of the present invention.
Figure 4:
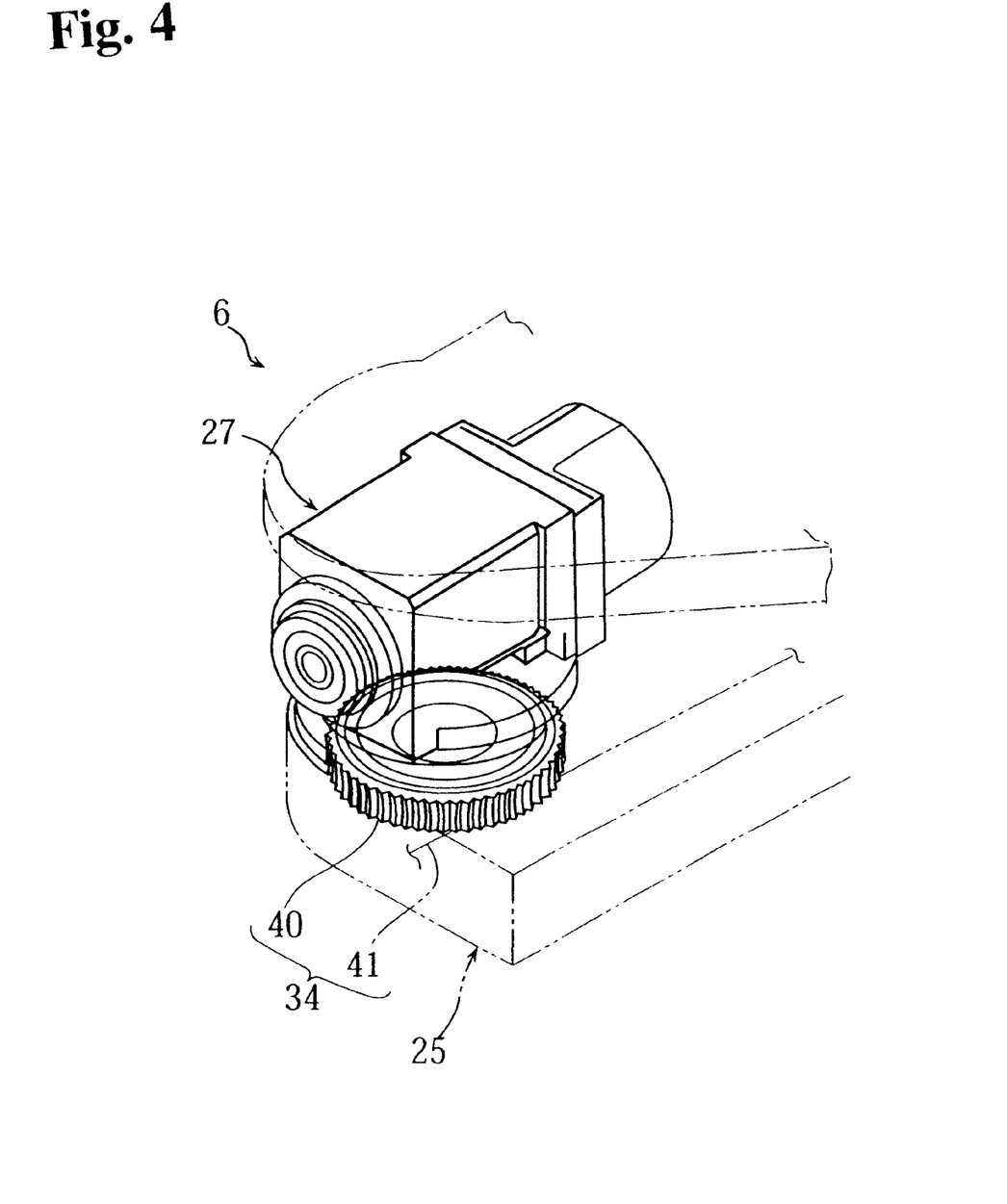
FIG. 4 is a perspective view of the second tool post according to an embodiment of the present invention.

The second tool post 6 is equipped with a support base 25 which is supported by the column 7 so as to be movable in the X-axis direction. The second tool post 6 also includes a tool post body 27 which is supported on the support base 25 so as to be rotationally indexable about a pivotal axis A, and clampable, by means of a tool index unit 26.

Figure 6:
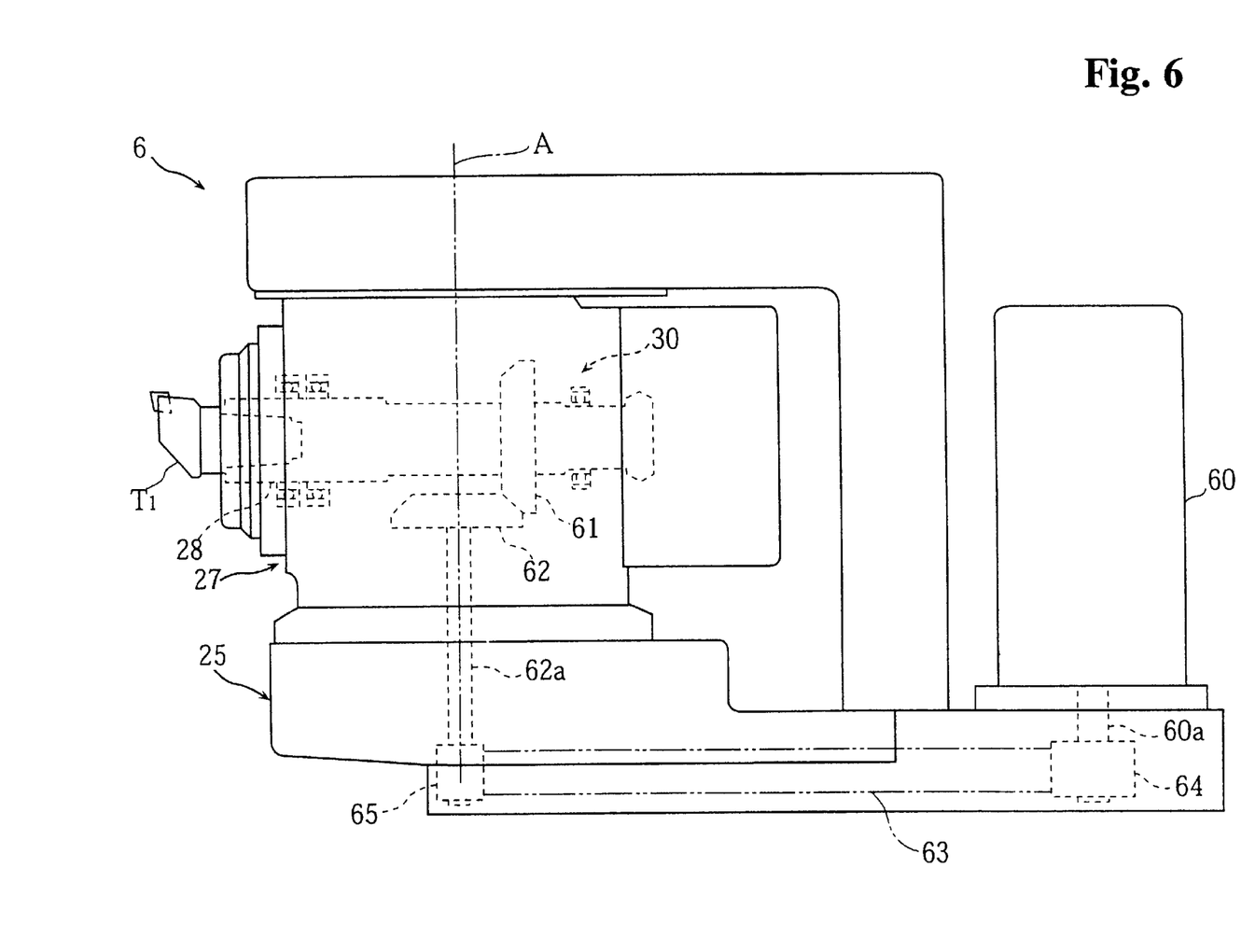
FIG. 6 is a side view of a belt driving mechanism of the second tool post according to an embodiment of the present invention.

A tool spindle 28 for grasping a tool T1 in such a way that the tool T1 can be loaded thereto and unloaded therefrom is rotatably inserted into the tool post body 27, and the tool spindle 28 is rotationally driven by a belt driving mechanism 30. This belt driving mechanism 30 is constructed so that, as shown in FIG. 6, a tool-spindle driving motor 60 placed on a rear end portion of the support base 25 is connected to spiral bevel gears 61, 62 provided in the tool spindle 28 by means of a timing belt 63. This timing belt 63 is wound around a driving pulley 64 set on a driving shaft 60a of the tool-spindle driving motor 60 and around a driven pulley 65 set on a rotating shaft 62a of the spiral bevel gear 62.

The tool index unit 26 includes a rotation base 32 fixed to the tool post body 27, a fixing base 33 placed within the rotation base 32 so as to be coaxial therewith and fixed to the support base 25, a worm mechanism 34 for rotationally driving the rotation base 32 to a specified index angular position, and a coupling mechanism 35 for fixing the rotation base 32 to the index angular position of the fixing base 33.

The coupling mechanism 35 is equipped with a rotational-side coupling 36 fixed to the rotation base 32, a stationary-side coupling 37 placed inside the rotational-side coupling 36 so as to be coaxial therewith and fixed to the support base 25, and a connecting coupling 38 placed so as to be movable up and down between an engagement position for engagement with the two couplings 36, 37, and a disengagement position for disengagement therefrom.

The worm mechanism 34 is composed of a worm wheel 40 fixed to the rotational-side coupling 36, and a worm gear 41 coupled to an unshown rotation driving motor, where a gear portion 41a of the worm gear 41 is engaged with the worm wheel 40.

Referring to the tool index unit 26, as the connecting coupling 38 moves up, the engagement between the rotational-side coupling 36 and the stationary-side coupling 37 is released. In this state, rotation of the rotation driving motor is transferred from the worm gear 41 to the rotation base 32 via the worm wheel 40 and the rotational-side coupling 36, by which the tool post body 27 is indexed to a specified rotational angle. Then, the connecting coupling 38 moves down to engage with the two couplings 36, 37, thereby clamping the tool post body 27 at the desired rotational angle.

Figure 5:
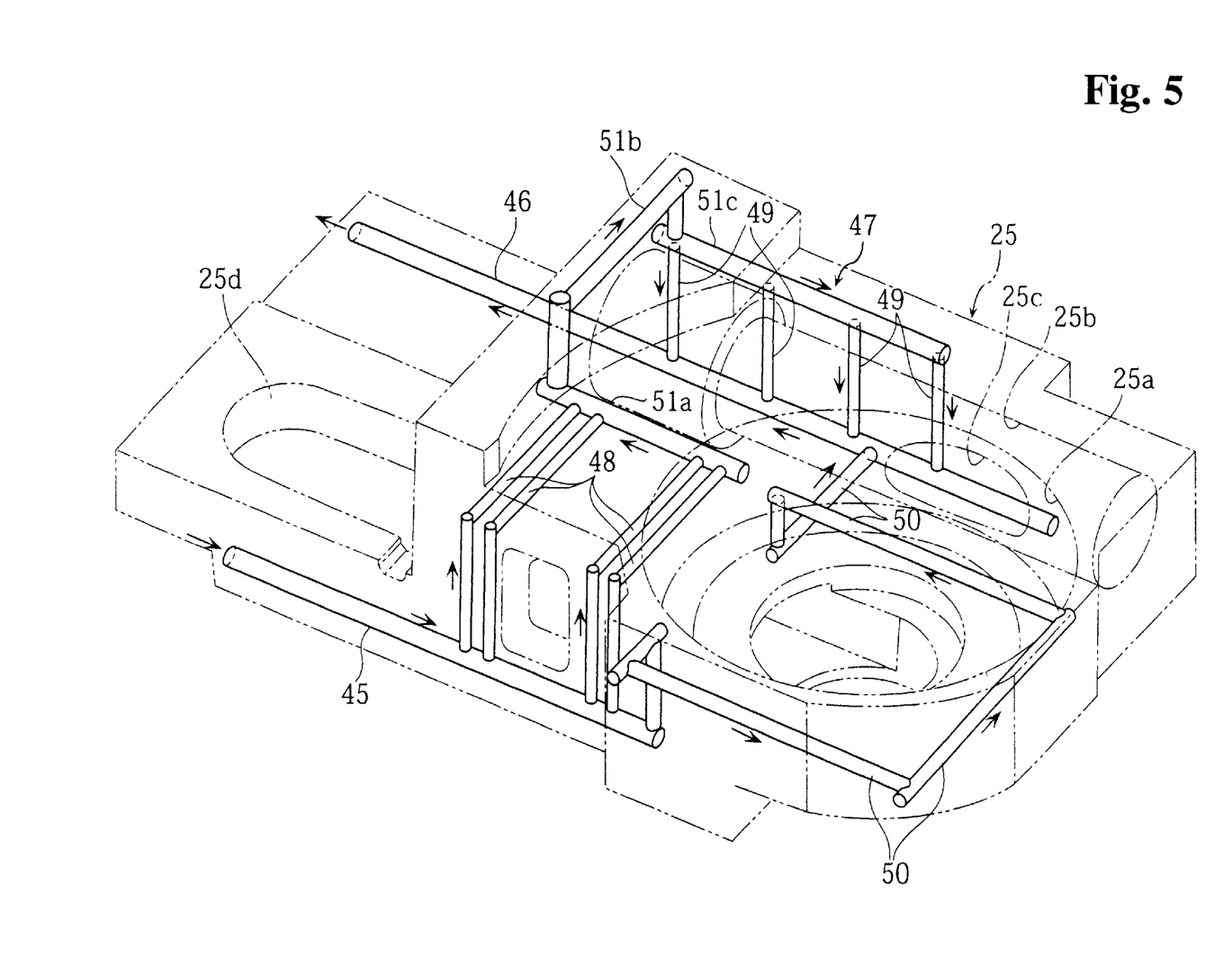
FIG. 5 is a schematic perspective view showing a coolant passage in a support base of the second tool post according to an embodiment of the present invention.

As shown in FIG. 5, the support base 25 is rectangular-plate shaped, and includes an accommodation-recess portion 25a for accommodating therein the worm wheel 40 formed at a front end portion of the support base 25. Also, an insertion hole 25b extending in the X-axis direction is formed beside the accommodation-recess portion 25a of the support base 25, and the worm gear 41 is inserted and positioned within the insertion hole 25b. A window 25c is formed in the accommodation-recess portion 25a, and the gear portion 41a of the worm gear 41 is engaged with the worm wheel 40 via the window 25c. Further, the support base 25 has a belt-recess portion 25d formed so as to extend in the X-axis direction, where the timing belt 63 and the pulleys 64, 65 are accommodated and placed in the belt-recess portion 25d.

Coolant passages are formed in the support base 25. These coolant passages are formed by drilling holes corresponding to individual passages in the support base 25 so that those holes communicate with one another. The outer end openings of the individual holes are closed with plugs or the like. The coolant passages are made up so that a coolant supply passage 45 is connected to an oil coolant supply source (not shown). Further a coolant discharge passage 46 that discharges the coolant outside is operatively connected to a coolant flow passage 47.

The coolant supply passage 45 is formed below and outside of the belt-recess portion 25d, and the coolant discharge passage 46 is formed below and outside of the insertion hole 25b.

The coolant flow passage 47 is composed of four first flow passages 48 formed so as to a surround central portion of the belt-recess portion 25d, four second flow passages 49 formed so as to extend along the outer periphery of the insertion hole 25b, and one third flow passage 50 formed so as to surround the outer periphery of the accommodation-recess portion 25a.

The upstream ends of the first flow passages 48 are connected to the coolant supply passage 45, and their downstream ends are connected to a discharge header 51a. This discharge header 51a is connected to a feed passage 51b to a supply header 51c, where the upstream ends of the second flow passages 49 are connected to the supply header 51c. The further downstream ends of the second flow passages 49 are connected to the coolant discharge passage 46. An upstream end of the third flow passage 50 is connected to the coolant supply passage 45, and its downstream end is connected to the coolant discharge passage 46.

Next, the operation and the effects of this embodiment will be explained.

In the combined-machining lathe 1 of this embodiment, a workpiece grasped by the chuck 20 of the first headstock 3 is subjected to a specified machining with a tool T of the first tool post 5, while a workpiece grasped by the chuck 11 of the second headstock 4 is subjected to a specified machining with a tool of the second tool post 6. In this case, the machining is done with the tool T of the turret 17 while the saddle 15 of the first tool post 5 and the tool post body 16 are accommodated in the accommodating or recessed portion "a" of the first headstock 3.

According to this embodiment, since the turret 17 of the first tool post 5 is disposed closer to the second headstock 4 and is positioned so as to face the second headstock 4, interference between the tool post body 16 and the second headstock 4 in the process of machining the workpiece grasped by the chuck 20 of the first headstock 3 with the tool of the turret 17 can be avoided without requiring the size of the fixed bed 2 as well as the whole machine to be increased.

Also, since the spindle portion 3a of the first headstock 3 overhangs toward the second headstock 4 from the base portion 3b creating the accommodating portion "a" defined by the spindle portion 3a and the base portion 3b, the machining of the workpiece can be carried out while the saddle 15 and the tool post body 16 are accommodated in the accommodating portion "a". Further, the workpiece of the chuck 20 can be machined while the turret 17 is placed on the side closer to the second headstock 4. As a result, an increase in size of the machine can be prevented, a decrease in structural support rigidity due to the overhanging of the second headstock can be avoided, and these measures help prevent a decrease in machining accuracy.

Also, since the accommodating portion "a" is defined by overhanging the spindle portion 3a of the first headstock 3 fixed to the fixed bed 2 and by fixedly connecting the overhanging portion to the bed 2 with the leg portion 3d, structural support rigidity of the first headstock 3 can be ensured while the first headstock 3 is provided with the accommodating portion "a".

Further, since the base portion 3b of the first headstock 3 is formed with a broad width so as to extend from the upper edge portion to the lower edge portion of the front sloped surface 2a of the fixed bed 2, a decrease in the structural support rigidity due to the overhanging of the spindle portion 3a can be avoided.

According to this embodiment, in the support base 25 of the second tool post 6, the first, second and third flow passages 48, 49 and 50 are formed so as to surround the belt-recess portion 25d accommodating the timing belt 63 therein. The insertion hole 25b for inserting therein the worm gear 41, and the accommodation-recess portion 25a for accommodating therein the worm wheel 40 are also formed in the support base 25. A coolant is supplied into the individual flow passages 48 to 50. Thus, heat generation from the drive system including the driving belt and the gears can be removed, so that effects on the machining accuracy due to heat displacement can be avoided.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2000-248292 filed Aug. 18, 2000 is hereby incorporated by reference.

What is claimed is:

1. A machine tool comprising:
   a first headstock fixed on a fixed bed;
   at least one of a tailstock and a second headstock is movably disposed on the fixed bed so as to be movable along the fixed bed; and
   a tool post body for rotationally supporting a turret having a plurality of tools set thereon, the tool post body being movably disposed between the first headstock and the at least one of a tailstock and a second headstock by moving the tool post body along a guide rail on the fixed bed, wherein the turret is placed on one side of the tool post body that is closer to the at least one of a tailstock and a second headstock, and the first headstock has a recessed portion that is dimensioned to accommodate the tool post body therein, and wherein the first headstock includes a base portion that covers a portion of the guide rail adjacent the first headstock, wherein the first headstock comprises a base portion fixed to the fixed bed, and a spindle portion for supporting a spindle, the spindle portion including an overhanging portion that extends toward the at least one of a tailstock and a second headstock, the overhanging portion being connected to the fixed bed by a leg portion, and wherein the recessed portion is defined by the overhanging portion, the base portion and the leg portion.

2. The machine tool according to claim 1, wherein the fixed bed includes a sloped surface having an upper edge and a lower edge and the first headstock includes a base portion that is formed so as to extend from the upper edge to the lower edge of the sloped surface.

3. The machine tool according to claim 1, wherein the fixed bed includes a sloped surface having an upper edge and a lower edge and the base portion of the first headstock is formed so as to extend from the upper edge to the lower edge of the sloped surface.

4. A machine tool comprising:

a first headstock fixed on a fixed bed;

at least one of a tailstock and a second headstock disposed on at least one guide rail provided on the fixed bed so that the at least one of the tailstock and the second headstock is movable along the at least one guide rail; and a tool post body for rotationally supporting a turret having a plurality of tools set thereon, the tool post body being movably disposed between the first headstock and the at least one of a tailstock and a second headstock on the at least one guide rail, wherein the turret is placed on a side of the tool post body that is further from the first headstock, and the first headstock has two portions which form a recessed portion adjacent thereto and wherein the recessed portion can accommodate the tool post body therein when the tool post body is disposed adjacent to the first headstock, wherein the two portions in the first headstock comprise a base portion fixed to the fixed bed, and a spindle portion for supporting a spindle, the spindle portion including an overhanging portion that extends toward the at least one of a tailstock and a second headstock, the overhanging portion being connected to the fixed bed by a leg portion, and wherein the recessed portion is defined by the overhanging portion, the base portion and the leg portion.

5. The machine tool according to claim 4, wherein the fixed bed includes a sloped surface having an upper edge and a lower edge and the base portion of the first headstock is formed so as to extend from the upper edge to the lower edge of the sloped surface.

6. The machine tool according to claim 4, wherein the fixed bed includes a sloped surface having an upper edge and a lower edge and the first headstock includes a base portion that is formed so as to extend from the upper edge to the lower edge of the sloped surface.

* * * * *